UNITED STATES PATENT OFFICE.

EMILE CHEVIGNY, OF RICEHILL, OREGON.

COMPOSITION OF MATTER FOR PAINTING AND PRESERVING WOOD.

No. 824,974.     Specification of Letters Patent.     Patented July 3, 1906.

Application filed February 1, 1906. Serial No. 299,066.

*To all whom it may concern:*

Be it known that I, EMILE CHEVIGNY, a citizen of the United States, residing at Ricehill, in the county of Douglas and State of Oregon, have invented a new and useful Composition for Painting and Preserving Wood, of which the following is a description.

This invention relates to improvements in compositions for coating the surface of wood to preserve the wood from decay.

The composition consists of water, concentrated lye, or potash, blue vitriol, (sulfate of copper,) common salt, and coal-tar. These ingredients are preferably compounded in the following proportions and in the following manner: One pound of the potash, one pound of the salt, and two pounds of the blue vitriol are thoroughly mixed together, to which mixture is added four gallons of water, preferably hot, and the ingredients thoroughly dissolved. To this is added thirty-six pounds of the coal-tar, the mixture being agitated or churned until it assumes the consistency of a thick paste and then allowed to stand, preferably from twelve to twenty-four hours. A mixture of one part linseed-oil, preferably boiled, and three parts coal-oil, either crude or refined, may then be added in the quantity desired to obtain the desired thinness or fluidity.

While the proportions of the ingredients mentioned are those preferred, it will be understood that other proportions may be employed without departing from the spirit of the invention. Also it will be understood that the composition may be variously colored to suit individual tastes.

The composition may be applied by means of a brush, or it may be used as a bath and the articles to be preserved submerged therein.

What I claim as new, and desire to secure by Letters Patent, is—

1. The herein-described composition consisting of water, potash, blue vitriol, salt and coal-tar.

2. The herein-described composition consisting of water, potash, blue vitriol, salt, coal-tar and mixed oil; substantially as described.

3. The herein-described composition of matter for painting and preserving wood consisting of water, four gallons, potash one pound, salt one pound, blue vitriol two pounds, and coal-tar thirty-six pounds.

E. CHEVIGNY.

Witnesses:
  Z. L. DIMMICK,
  ROY MILLER.